(12) United States Patent
Lee

(10) Patent No.: US 6,470,134 B1
(45) Date of Patent: Oct. 22, 2002

(54) METHOD AND APPARATUS FOR DUBBING A RECORDING TAPE

(75) Inventor: Chang-Hyeon Lee, Kyonggi-do (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/218,452

(22) Filed: Dec. 22, 1998

(30) Foreign Application Priority Data

Dec. 29, 1997 (KR) ............................................ 97-76055

(51) Int. Cl.⁷ ................................................ H04N 5/92
(52) U.S. Cl. .............................. 386/52; 386/64; 360/15; 369/84
(58) Field of Search ........................... 386/4, 45, 1, 46, 386/52, 53–64, 125–126; 369/83–85; 360/13–17; H04N 5/76, 5/92, 9/79

(56) References Cited

U.S. PATENT DOCUMENTS 5,521,894 A * 5/1996 Hiranuma .................... 369/84
6,278,564 B1 * 8/2001 Arai et al. ................... 386/109
6,335,910 B1 * 1/2002 Yoshizawa et al. ...... 369/53.18

* cited by examiner

Primary Examiner—Thai Tran
(74) Attorney, Agent, or Firm—Sughrue Mion, PLLC

(57) ABSTRACT

A method and apparatus for dubbing a recording tape in a video recording and reproducing device. A source video recording and reproducing device reproduces data of a source recording tape in response to a dubbing demand from a user and confirms an error recording portion and a data unrecorded portion. The source video recording and reproducing device performs error correction with respect to the error recording portion and generates a non-recording control pulse with respect to the data unrecorded portion. The reproduced data and the non-recording control pulse is transmitted to a target video recording and reproducing device. The target video recording and reproducing device records, in a target recording tape, the reproduced data except data transmitted during an interval of the non-recording control pulse.

4 Claims, 5 Drawing Sheets

METHOD AND APPARATUS FOR DUBBING A RECORDING TAPE

BACKGROUND OF THE INVENTION

1. Field of the Invention

The present invention relates to a video recording and reproducing device, and more particularly, to a method and apparatus for dubbing a source recording tape onto a target recording tape in a camcorder.

2. Description of the Related Art

A recording tape of a standard definition (SD) format used in a digital video camcorder (DVC) has a width of ¼ inches (6.35 mm), and may have various recording times (e.g., 30 minutes, 60 minutes, and 4 hours and 30 minutes). If a user repeatedly records and reproduces the recording tape, an error portion or a unrecorded data portion may occur in the recording tape.

When a source recording tape with scratches or creases is reproduced, a reproduced picture may include an error (noise) portion 2 as shown in FIG. 1. Moreover, the reproduced picture may include a discontinuous portion of a unrecorded data portion or a damaged data portion as indicated by a reference numeral 4 in FIG. 1. If such a source recording tape is dubbed onto another tape, the error portion 2 and the discontinuous portion 4 are also recorded onto a target recording tape.

SUMMARY OF THE INVENTION

It is therefore an object of the present invention to provide a recording tape dubbing method and apparatus which can record a clear and continuous picture in a target recording tape.

It is another object of the present invention to provide a recording tape dubbing method and apparatus which can dub a source recording tape into a target recording tape without any video error portion.

The present invention is directed to a method for dubbing a recording tape in a video recording and reproducing device. The method comprises the steps of reproducing data of a source recording tape using a source video recording and reproducing device in response to a dubbing demand from a user and confirming an recording error portion and a unrecorded data portion; performing error correction with respect to the recording error portion and generating a non-recording control pulse with respect to the unrecorded data portion via the source video recording and reproducing device to; transmitting the reproduced data and the non-recording control pulse from the source video recording and reproducing device to a target video recording and reproducing device; and recording in a target recording tape the reproduced data except data transmitted during an interval of the non-recording control pulse.

The present invention is also directed to an apparatus for dubbing a recording tape in a video recording and reproducing device. The apparatus comprises a source video recording and reproducing device for reproducing data of a source recording tape in response to a dubbing demand from a user, performing error correction with respect to an recording error portion among the reproduced data, and generating a non-recording control pulse with respect to a unrecorded data portion or a damaged data portion exceeding a limit among the reproduced data; and a target video recording and reproducing device for recording the reproduced data except data transmitted while the non-recording control pulse is generated.

BRIEF DESCRIPTION OF THE DRAWINGS

The above and other objects, features and advantages of the present invention will become more apparent from the following detailed description when taken in conjunction with the accompanying drawings in which like reference numerals indicate like portions. In the drawings.

DETAILED DESCRIPTION OF THE PREFERRED EMBODIMENT

A preferred embodiment of the present invention will be described hereinbelow with reference to the accompanying drawings. In the following description, well known functions or constructions are not described in detail to avoid obscuring the invention in unnecessary detail.

Figure 2:
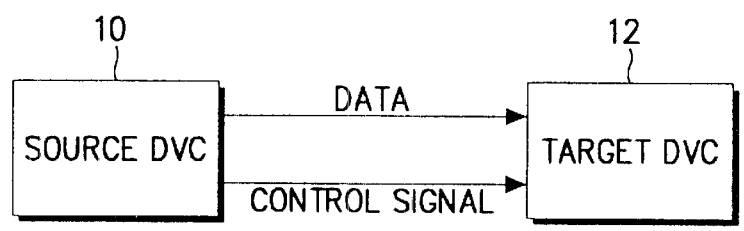
FIG. 2 illustrates a recording tape dubbing apparatus according to the present invention.

Referring to FIG. 2, a DVC recording tape dubbing apparatus according to the present invention includes a source DVC 10 and a target DVC 12. The source DVC 10 reproduces data recorded in a source recording tape and transmits the reproduced data to the target DVC 12. Further, the source DVC 10 checks a dubbing signal and a unrecorded data portion or a damaged data portion of the source recording tape and transmits control signals, such as a dubbing control signal and a non-recording control pulse corresponding to the unrecorded data portion or the damaged data portion, to the target DVC 12. The target DVC 12 performs a dubbing mode by the dubbing control signal to record the reproduced data transmitted from the source DVC 10 in a target recording tape. While the non-recording control pulse is transmitted, the target DVC 12 does not record the reproduced data.

Figure 3A:
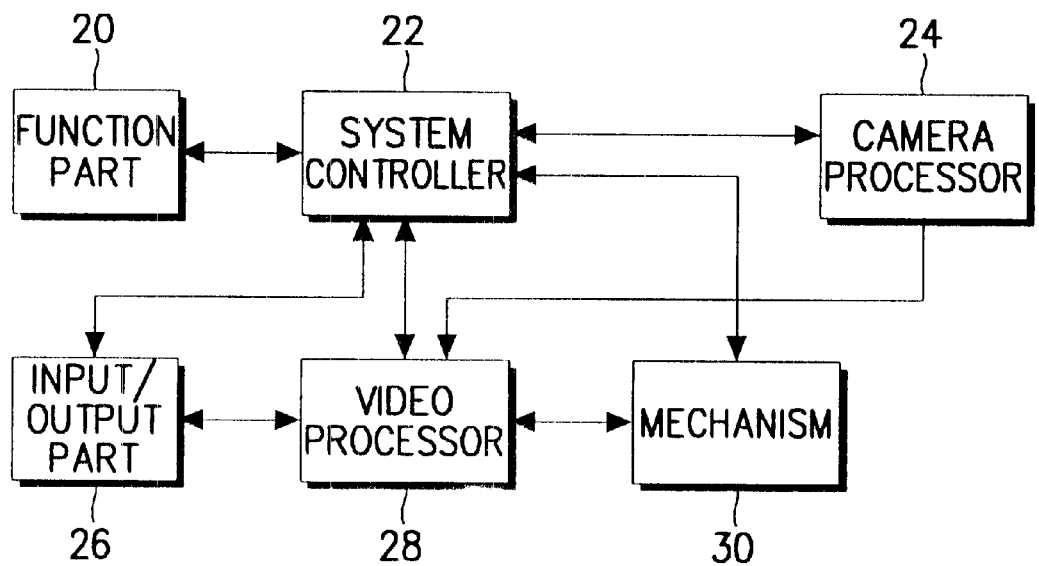
FIG. 3A is a schematic block diagram showing a source DVC and a target DVC illustrated in FIG. 2.

FIG. 3A is a schematic block diagram of the source DVC 10 and the target DVC 12 illustrated in FIG. 2. A function portion 20 includes keys or a remote controller and supplies signals corresponding to commands from a user to a system controller 22. The system controller 22 judges the entire operation of a system and controls a video processor 28, a camera processor 24 and a mechanism 30. The camera processor 24 takes a picture of an object, converts an optical signal into an electric signal, and transmits the electric signal to the video processor 28. The video processor 28 processes a video signal supplied from the camera processor 24 under the control of the system controller 22 and records the processed video signal in a recording tape of the mechanism 30. Moreover, the video processor 28 processes a video signal reproduced from the recording tape of the mechanism 30. An input/output portion 26 inputs and outputs a video signal. The mechanism 30 includes a recording tape, a head drum having a recording head, a head drum motor, a capstan motor, a loading motor, and a servo portion for controlling them. The mechanism 30 records a signal generated from the video processor 28 in the recording tape under the control of the system controller 22 and reads a signal recorded in the recording tape. The read signal is transmitted to the video processor 28.

Figure 1:
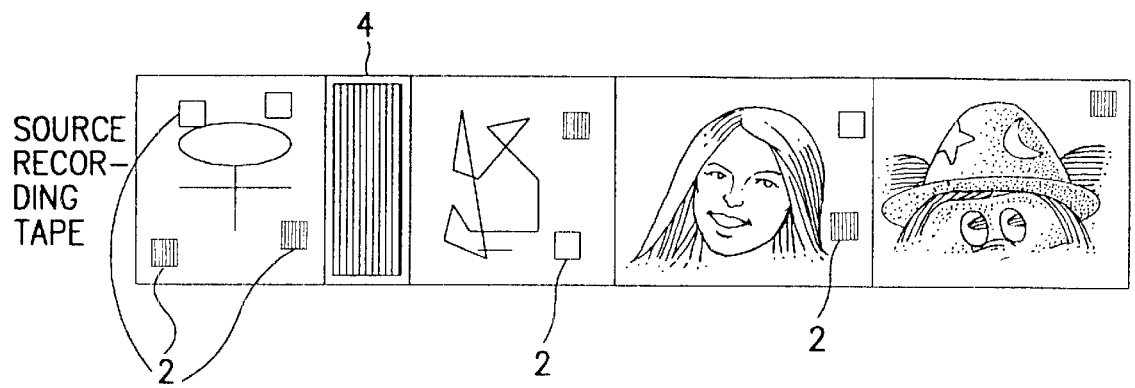
FIG. 1 illustrates an example of a picture displayed on a screen when reproducing a source recording tape with scratches or creases.
Figure 3B:
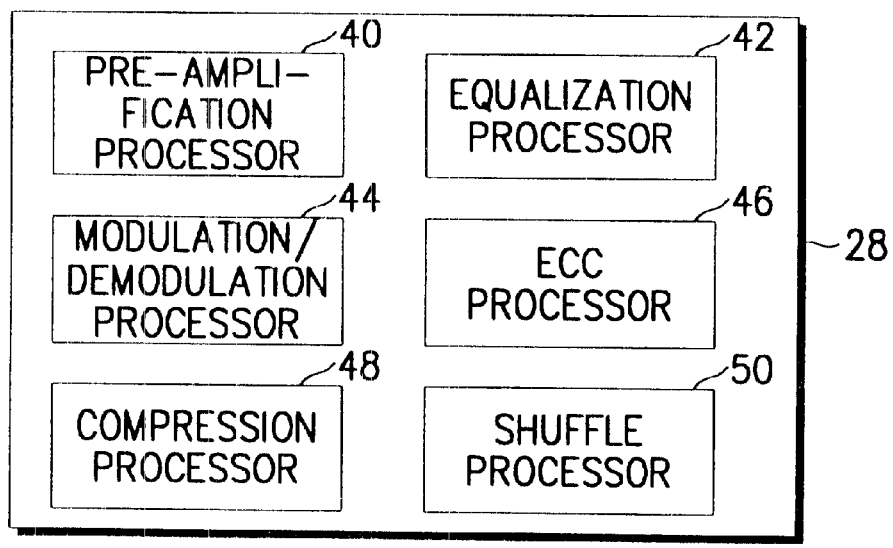
FIG. 3B is a detailed block diagram of a video processor of FIG. 3A.

FIG. 3B illustrates a detailed block diagram of the video processor 28 shown in FIG. 3A. The video processor 28 has a pre-amplification processor 40, an equalization processor 42, a modulation/demodulation processor 44, an error correction code (ECC) processor 46, a compression processor 48, and a shuffle processor 50. The pre-amplification processor 40 amplifies a signal for recording and reproduction. The equalization processor 42 implements equalization for a signal generated during recording and reproduction. The modulation/demodulation processor 44 modulates and demodulates a signal during recording and reproduction and makes track information. The track information is transmitted to the system controller 22. The ECC processor 46 compensates for an error generated during recording and reproduction. For example, the error portion 2 indicated in FIG. 1 is restored by the ECC processor 46. However, the damaged data portion exceeding a limit or the unrecorded data portion 4 shown in FIG. 1 is not restored by the ECC processor 46. The compression processor 48 compresses a signal at the rate of 5:1. The shuffle processor 50 shuffles data for compression and restores the data. When a video signal is recorded in the recording tape, it is sequentially processed in the shuffle processor 50, the compression procession 48, the ECC processor 46, the modulation/demodulation processor 44, the equalization processor 42, and the pre-amplification processor 40; and when the video signal is reproduced from the recording tape, it is processed in the reverse order.

Figure 4:
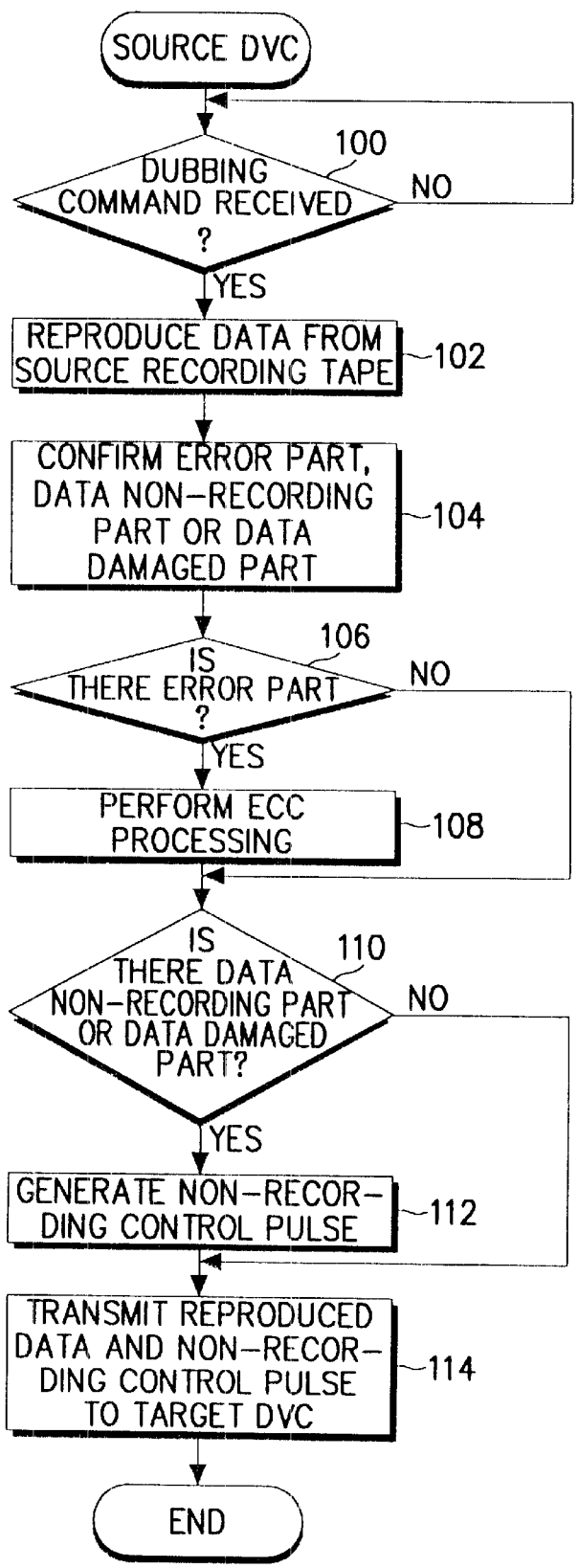
FIG. 4 is a flow chart illustrating a control process executed by a source DVC shown in FIG. 2.
Figure 5:
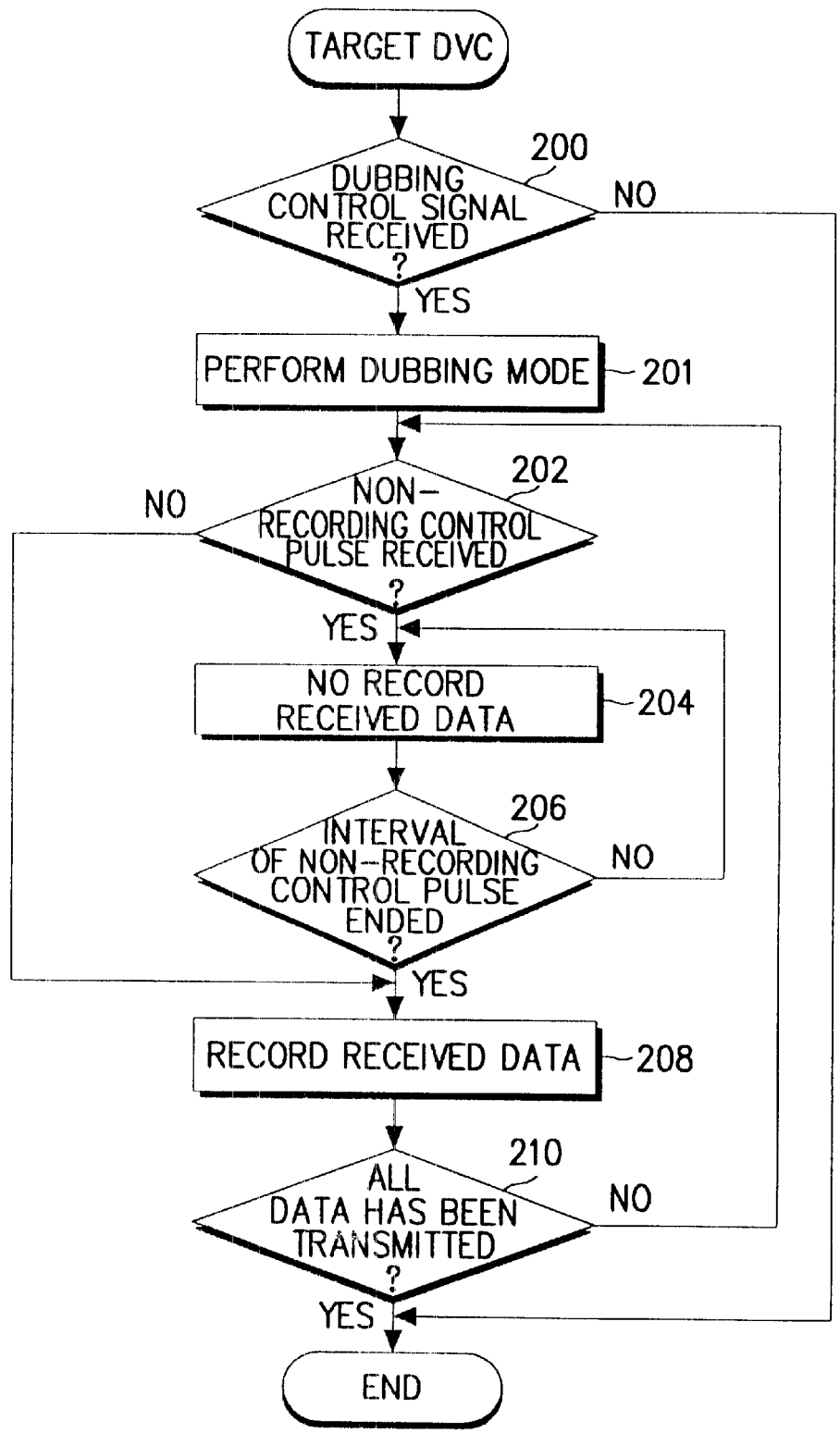
FIG. 5 is a flow chart illustrating a control process executed by a target DVC shown in FIG. 2.
Figure 6A:
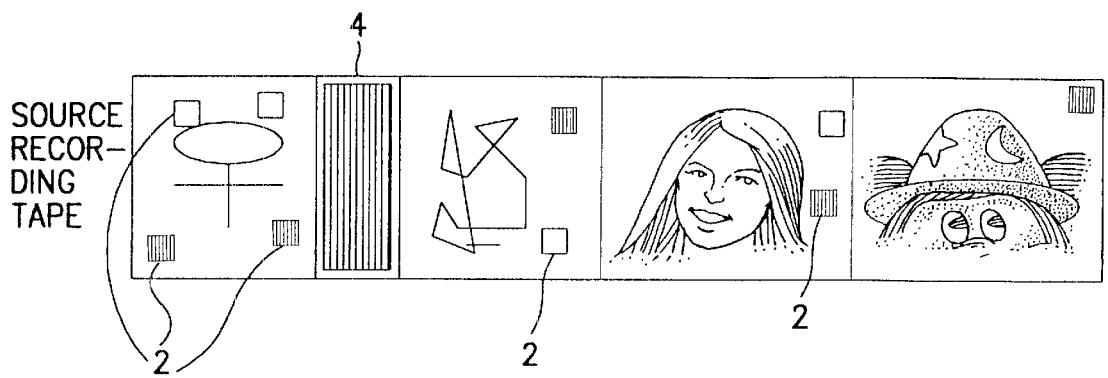
FIG. 6A illustrates an example of a picture displayed on a screen when reproducing a source recording tape with scratches or creases.
Figure 6B:
FIG. 6B is a timing chart of a non-recording control pulse with respect to the picture illustrated in FIG. 6A.
Figure 7:
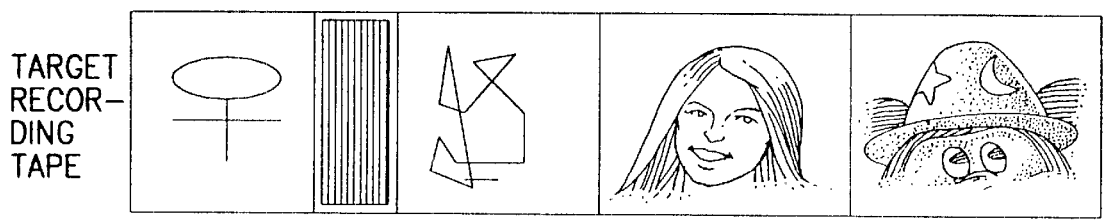
FIG. 7 illustrates an example of a picture displayed on a screen upon reproducing a target recording tape according to the present invention.

FIGS. 4 and 5 are flow charts illustrating control processes executed by the source DVC 10 and the target DVC 12, respectively. FIG. 6A illustrates an example of a picture displayed on a screen when reproducing a source recording tape with scratches or creases. FIG. 6B is a timing chart of a non-recording control pulse with respect to the picture shown in FIG. 6A. FIG. 7 illustrates an example of a picture displayed on a screen when reproducing a target recording tape according to the present invention.

In performing a dubbing operation, the input/output portion 26 of the source DVC 10 is connected to that of the target DVC 12 through a cable. Referring to FIGS. 2 and 4, the source DVC 10 checks whether a dubbing command is received from a user through the function portion 20 at step 100. If there is a dubbing command, data is reproduced from a source recording tape at step 102. The source DVC 10 confirms at step 104 an error portion, for example, indicated by a reference numeral 2 in FIG. 6A, or a unrecorded data portion or a damaged data portion exceeding the limit, for example, indicated by a reference numeral 4 in FIG. 6A. It is checked at step 106 whether there is an error portion. If it exists, ECC processing for the error portion is done at step 108. It is checked at step 110 whether there is a unrecorded data portion or a damaged data portion exceeding the limit. If it exists, a non-recording control pulse is generated at step 112. As shown in FIG. 6B, the non-recording control pulse is generated during an interval of the portion 4. The reproduced data and the non-recording control pulse are transmitted to the target DVC 112 at step 114. As a result, the source DVC 10 transmits to the target DVC 12 a video signal in which the error portion is eliminated.

Referring to FIGS. 2 and 5, the target DVC 12 checks whether a dubbing control signal is received from the source DVC 10 at step 200. If the dubbing control signal is received, a dubbing mode is performed at step 201. It is checked at step 202 whether the non-recording control pulse is received from the source DVC 10. If the non-recording control pulse is received, data received during an interval of the non-recording control pulse is not recorded in a target recording tape at step 204. Therefore, the data damaged portion exceeding the limit or the data unrecorded portion 4 shown in FIG. 6B is not recorded in the target recording tape. Consequently, a video signal without any error portion or discontinuous portion is recorded in the target recording tape as shown in FIG. 7. It is checked at step 206 whether the interval of the non-recording control pulse is ended. If it is ended, the received data is recorded in the target recording tape at step 208. It is checked at step 210 whether data has been completely transmitted from the source DVC 10. If data has not been completely transmitted, step 202 is returned to. If data has been completely transmitted, the control process is ended. Thus, a clear and continuous picture is recorded in the target recording tape.

As described above, the dubbing operation according to the present invention makes it possible to record an error-free, clear and continuous picture in a target recording tape.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for dubbing a recording tape in a video recording and reproducing device, comprising the steps of:

reproducing, at a source video recording and reproducing device, data recorded on a source recording tape in response to a dubbing demand from a user;

determining whether a recording error portion or a unrecorded data portion exist in the data reproduced from the source recording tape;

performing, at the source video recording and reproducing device, error correction with respect to said recording error portion, if it is determined that said recording error portion exists in the data reproduced from the source recording tape;

generating, at the source video recording and reproducing device, a non-recording control pulse corresponding to said unrecorded data portion, if it is determined that said unrecorded data portion exists in the data reproduced from the source recording tape;

transmitting the reproduced data and said non-recording control pulse from the source video recording and reproducing device to a target video recording and reproducing device; and recording, in a target recording tape, said reproduced data in accordance with said non-recording control pulse, wherein the reproduced data is not recorded during a time interval corresponding to said non-recording control pulse.

2. The method as claimed in claim 1, wherein said unrecorded data portion includes damaged data exceeding a predetermined amount.

3. An apparatus for dubbing a recording tape in a video recording and reproducing device, comprising:

a source video recording and reproducing device for reproducing data recorded on a source recording tape in response to a dubbing demand from a user, performing error correction with respect to an recording error portion of the reproduced data, and generating a non-recording control pulse with respect to a data unrecorded portion or a data damaged portion of the reproduced data exceeding a predetermined amount; and a target video recording and reproducing device for receiving the reproduced data and said non-recording control pulse from the source video recording and reproducing device, and recording said reproduced data in accordance with said non-recording control pulse, wherein the reproduced data is not recorded during a time interval corresponding to said non-recording control pulse.

4. The apparatus as claimed in claim 3, wherein said source and target video recording and reproducing devices are digital video camcorders.

* * * * *